United States Patent
Kim et al.

(10) Patent No.: US 11,546,671 B2
(45) Date of Patent: Jan. 3, 2023

(54) PROVIDING PROMOTION CHANNEL

(71) Applicant: KT CORPORATION, Gyeonggi-do (KR)

(72) Inventors: Jung-Ho Kim, Daejeon (KR); Byung-Jae Kim, Daejeon (KR); Joon-Woo Park, Daejeon (KR); Hyun-Jung Oh, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/198,631

(22) Filed: Nov. 21, 2018

(65) Prior Publication Data

US 2019/0158932 A1    May 23, 2019

(30) Foreign Application Priority Data

Nov. 21, 2017  (KR) .......................... 10-2017-0155771

(51) Int. Cl.
| | |
|---|---|
| *H04N 21/81* | (2011.01) |
| *H04N 21/45* | (2011.01) |
| *H04N 21/472* | (2011.01) |
| *H04N 21/44* | (2011.01) |
| *H04N 21/462* | (2011.01) |

(52) U.S. Cl.
CPC ..... *H04N 21/812* (2013.01); *H04N 21/44016* (2013.01); *H04N 21/4532* (2013.01); *H04N 21/4622* (2013.01); *H04N 21/47202* (2013.01)

(58) Field of Classification Search
CPC .......................... H04N 21/235; H04N 21/2442
See application file for complete search history.

(56) References Cited

U.S. PATENT DOCUMENTS

| | | | | |
|---|---|---|---|---|
| 10,051,305 | B2* | 8/2018 | Tidwell | ............... H04N 21/4147 |
| 2002/0042921 | A1* | 4/2002 | Ellis | ................... H04N 21/2183 |
| | | | | 725/87 |
| 2002/0083452 | A1* | 6/2002 | Kikinis | ................ H04N 21/454 |
| | | | | 725/46 |
| 2003/0172378 | A1* | 9/2003 | Lalitha | ............... H04N 21/4532 |
| | | | | 725/34 |
| 2005/0108754 | A1* | 5/2005 | Carhart | ................... H04H 60/66 |
| | | | | 725/47 |

(Continued)

FOREIGN PATENT DOCUMENTS

| | | |
|---|---|---|
| JP | 2005-130075 A | 5/2005 |
| JP | 2005-311676 A | 11/2005 |

(Continued)

*Primary Examiner* — Mushfikh I Alam
(74) *Attorney, Agent, or Firm* — IP Legal Services, LLC

(57) ABSTRACT

A real-time customized promotion channel may be provided according to at least one attribute of digital contents displayed on a user device. Such a user device may include a communication circuit configured to receive channel service information from the server, an Input/Output (I/O) circuit configured to reproduce digital contents and output the reproduced digital contents to a display, and a controller configured to determine a promotion channel related to at least one attribute of the digital contents and request the determined promotion channel to the server. The communication circuit may be configured to receive the requested promotion channel from the server, and the I/O circuit is configured to reproduce the promotion channel and output the reproduced promotion channel through the display after the outputted digital contents ends.

17 Claims, 8 Drawing Sheets

(56) References Cited

U.S. PATENT DOCUMENTS

| | | | | |
|---|---|---|---|---|
| 2006/0010467 A1* | 1/2006 | Segel | H04N 21/4667 | 725/34 |
| 2006/0015903 A1* | 1/2006 | MacBeth | H04N 5/44543 | 725/46 |
| 2006/0212896 A1* | 9/2006 | Lin | H04L 12/1859 | 725/32 |
| 2007/0124770 A1* | 5/2007 | Guillorit | H04N 5/4403 | 725/56 |
| 2007/0136772 A1* | 6/2007 | Weaver | H04N 21/6377 | 725/95 |
| 2008/0184300 A1* | 7/2008 | Macrae | H04N 5/44543 | 725/39 |
| 2009/0193460 A1* | 7/2009 | Barnett | H04N 21/44222 | 725/38 |
| 2011/0030010 A1* | 2/2011 | Overbaugh | H04N 5/44543 | 725/45 |
| 2011/0247037 A1* | 10/2011 | Pandey | H04N 21/47 | 725/39 |
| 2012/0317598 A1* | 12/2012 | Gilson | H04N 21/234345 | 725/32 |
| 2013/0067516 A1* | 3/2013 | Wu | H04N 21/482 | 725/39 |
| 2013/0091520 A1* | 4/2013 | Chen | H04N 21/25891 | 725/34 |
| 2013/0141536 A1* | 6/2013 | Choe | H04N 13/194 | 348/43 |
| 2013/0276022 A1* | 10/2013 | Tidwell | H04N 21/2547 | 725/34 |
| 2013/0290233 A1* | 10/2013 | Ferren | G06K 9/3266 | 706/46 |
| 2013/0339153 A1* | 12/2013 | Mishra | G06Q 30/0271 | 705/14.66 |
| 2016/0092935 A1* | 3/2016 | Bradley | G06Q 30/0276 | 705/14.72 |
| 2016/0150257 A1* | 5/2016 | Sokolov | H04N 21/25435 | 725/8 |

FOREIGN PATENT DOCUMENTS

| | | |
|---|---|---|
| KR | 10-2009-0120920 A | 11/2009 |
| KR | 10-1239099 B1 | 3/2013 |
| KR | 10-1756220 B1 | 7/2017 |

* cited by examiner

FIG.9

Promo channel descriptor

| Syntax | Bits | Format |
|---|---|---|
| Promo_channel_descriptor () { | | |
|    descriptor_tag | 8 | uimsbf |
|    descriptor_length | 8 | uimsbf |
|    promo_type | 8 | uimsbf |
| } | | | descriptor_tag: This 8-bit field with value 0x90 identifies this descriptor.
descriptor_length: This 8-bit field identifies the number of bytes following the length field.
promo_type: This is an 8-bit field specifying the type of contents in the promo channel. This filed has the value of following table.

| promo_type | Description |
|---|---|
| 0x00 | Default |
| 0x01 | General |
| 0x02 | TV |
| 0x03 | Movie |
| 0x04 | Kids |
| 0x05 ~ 0xFF | Reserved for future use |

FIG.10

```
<IndividualLinearTVServiceInformation>
    <ServiceIdentifier>1.100.100</ServiceIdentifier>
    <ServiceId>100</ServiceId>
    <ServiceLocation>
        <IPMulticast>
            <IPMulticastAddress>233.1.1.100</IPMulticastAddress>
            <IPMulticastPort>5000</IPMulticastPort>
            <IPMulticastSource>F</IPMulticastSource>
        </IPMulticast>
    </ServiceLocation>
    <ServiceVisibility>true</ServiceVisibility>
    <StreamingType>dtp</StreamingType>
    <MultiplexMode>MPEG-2 TS</MultiplexMode>
    <AdditionalLinearTVDiscovery TypeOfService="1">
        <ServiceName lang="kor">가이드 채널</ServiceName>
        <Recording>true</Recording>
        <ExtendedDescription>
            <ExtendedItem name="PromoChannel">800100</ExtendedItem>
        </ExtendedDescription>
    </AdditionalLinearTVDiscovery>
</IndividualLinearTVServiceInformation>
```

PROVIDING PROMOTION CHANNEL

CROSS REFERENCE TO PRIOR APPLICATIONS

The present application claims priority under 35 U.S.C. § 119 to Korean Patent Application No. 10-2017-0155771 (filed on Nov. 21, 2017).

BACKGROUND

The present disclosure relates to dynamically providing a promotion channel customized in real-time according to at least one attribute of digital contents that a viewer is watching.

Since a digital video broadcasting system has introduced, many service providers began to provide various types of digital contents according to a viewer's request through a typical TV broadcasting system. For example, a Video-On-Demand (VOD) service is one of representative services for providing digital contents, such as movies and music, according to a viewer or audience's request. In order to provide such a VOD service through a typical TV broadcasting system and enable a viewer to use a typical TV system for such a VOD service, a VOD service channel has been introduced. That is, the VOD service channel is one dedicated channel for a TV broadcasting system. Through such a VOD service channel, a VOD service provider transmits VOD service information. The VOD service information includes information for introducing and promoting available digital contents and information on a user interface for enabling a viewer to interact with a related server of the VOD service provider. When a viewer tunes his/her TV on the VOD service channel, a viewer is able to see information on available digital contents, and the viewer is provided with a user interface for purchasing the selected digital contents and watching the selected digital contents.

Such a VOD service channel may be referred to as a digital contents service channel or a promotion channel. When a user device (e.g., set-top box) is initially turned on (e.g. booting), promotion information may be shown on the VOD service channel in order to promote VOD services to viewers. However, such promotion information is not customized according to viewers' preferences.

SUMMARY

In accordance with an aspect of the present embodiment, a real-time customized promotion channel may be provided to a viewer according to at least one attribute of displayed digital contents.

In accordance with another aspect of the present embodiment, various promotion channels may be provided according to viewer's preferences through one dedicated channel in a digital broadcasting channel.

In accordance with another aspect of the present embodiment, at least one attribute of currently being displayed digital contents may be determined, one of promotion channels may be selected based on the determined attribute, and the selected promotion channel may be tuned at a digital contents service channel after the end of displaying the digital contents.

In accordance with still another aspect of the present embodiment, a service server may configure a plurality of hidden promotion channels each containing promotion information customized according to a predetermined attribute of related digital contents, transmit service channel information including the configured promotion channels to a user device, and transmit the configured promotion channels using one of a unicast transmission scheme or a multicast transmission scheme to the user device.

In accordance with further another aspect of the present embodiment, a user device may identify hidden promotion channels transmitted from a service server, generate channel list information, determine at least one attribute of digital contents currently being reproduced and displayed, select one of the hidden promotion channels based on the determined attribute and the channel list information, and tune a digital contents service channel with the selected hidden promotion channel after the displayed digital contents end.

In accordance with further still another aspect of the present embodiment, a service server may include information on a channel locator of a related hidden promotion channel in digital contents.

In accordance with yet another aspect of the present embodiment, a user device may detect information on a channel locator of a related hidden promotion channel in digital contents current being reproduced and displayed, select a hidden promotion channel having the detected channel locator, and tune a digital contents service channel with the selected hidden promotion channel after the displayed digital contents end.

In accordance with one embodiment, a user device may be provided for receiving a promotion channel. The user device may include a communication circuit configured to receive channel service information from the server, an Input/Output (I/O) circuit configured to reproduce digital contents and output the reproduced digital contents to a display, and a controller configured to determine a promotion channel related to at least one attribute of the digital contents and request the determined promotion channel to the server. The communication circuit may be configured to receive the requested promotion channel from the server, and the I/O circuit is configured to reproduce the promotion channel and output the reproduced promotion channel through the display after the outputted digital contents ends.

The controller may be configured to: identify a default promotion channel and a plurality of hidden promotion channels based on the received channel service information; and generate channel list information based on the identified default promotion channel and the identified hidden promotion channels.

The channel list information includes channel numbers and channel locators of the default promotion channel and the hidden promotion channels.

The controller may be configured to select one of the channel locators of the default promotion channel and the hidden promotion channels based on at least one attribute of the outputted digital contents and the channel list information.

When one of the channel locators of the hidden promotion channels is matched with at least one attribute of the outputted digital contents and the channel list information, the controller is configured to select the matched channel locator, and the communication circuit is configured to receive a hidden promotion channel corresponding to the selected channel locator.

A channel number of the default promotion channel and channel numbers of the hidden promotion channels are set to a same number.

The I/O circuit is configured to tune a promotion channel with the hidden promotion channel of the selected channel locator; and a channel number of the hidden promotion channel is identical to a channel number of the default promotion channel.

When a channel locator of the default promotion channel is matched with at least one attribute of the outputted digital contents and the channel list information, the controller is configured to select a channel locator of the default promotion channel, the communication circuit is configured to receive the default promotion channel, and the I/O circuit is configured to tune a promotion channel with the default promotion channel when the output digital contents end.

In accordance with another embodiment, a server may be provided for providing a promotion channel. The server may include a controller configured to set a default promotion channel and a plurality of hidden promotion channels, generate channel service information based on the default promotion channel and the hidden promotion channels; a communication circuit configured to transmit the generated channel service information to a user device and transmit at least one of the default promotion channel and the hidden promotion channels to the user device, wherein at least one of the default promotion channel and the hidden promotion channels is reproduced by the user device and output through a display after reproducing and outputting of related digital contents is end.

The default promotion channel and the hidden promotion channels are identified based on the channel service information; and the channel service information includes information on the default promotion channel and the hidden promotion channels and is used by the user device to generate channel list information.

The channel list information includes channel numbers and channel locators of the default promotion channel and the hidden promotion channels.

When one of the channel locators of the hidden promotion channels is matched with at least one attribute of the outputted digital contents, the communication circuit is configured to transmit the matched hidden promotion channel to the user device.

The controller is configured to set a channel number of the default promotion channel and channel numbers of the hidden promotion channels with a same channel number.

The user device tunes a promotion channel with the hidden promotion channel of the selected channel locator when the output digital contents is end; and the channel number of the hidden promotion channel is set to identical to the channel number of the default promotion channel.

When a channel locator of the default promotion channels is matched with at least one attribute of the outputted digital contents, the communication circuit is configured to transmit the matched default promotion channel to the user device.

The controller is configured to set the plurality of hidden promotion channels according to a genre of digital contents.

BRIEF DESCRIPTION OF THE DRAWINGS

FIG. 9 illustrates promotion channel information defined as a promo channel descriptor in digital video broadcasting (DVB) or advanced television systems committee (ATSC) digital broadcasting in accordance with at least one embodiment.

FIG. 10 illustrates promotion channel information defined as Extendeditem element in internet protocol television (IPTV) standard in accordance with at least one embodiment.

DETAILED DESCRIPTION OF EMBODIMENTS

In accordance with at least one embodiment, a service server may i) transmit (e.g., broadcast) a default promotion channel containing default promotion information and a plurality of hidden promotion channels each containing promotion information customized to a corresponding attribute of digital contents consumed by a viewer and ii) transmit channel information to a user device. The user device may detect an ending of digital contents being reproduced and displayed on a display, select one of on the default promotion channel and hidden promotion channels based on at least one attribute of the digital contents, and tune the selected promotion channel on a digital-contents service channel after displaying the digital contents. That is, a real-time customized promotion channel may be provided to a viewer according to at least one attribute of displayed digital contents. Furthermore, the service server may include information on a channel locator of a related hidden promotion channel in digital contents. The user device may detect information on a channel locator of a related hidden promotion channel in digital contents current being reproduced and displayed, select a hidden promotion channel having the detected channel locator, and tune a digital contents service channel with the selected hidden promotion channel after the displayed digital contents end.

Such a real-time customized and variable promotion channel in accordance with at least one embodiment, a digital video broadcasting system may be used. Such a system will be described in more detail with reference to FIG. 1. For convenience and ease of understanding, the digital video broadcasting system is illustrated as including one service server 200. However, embodiments of the present disclosure are not limited thereto.

Figure 1:
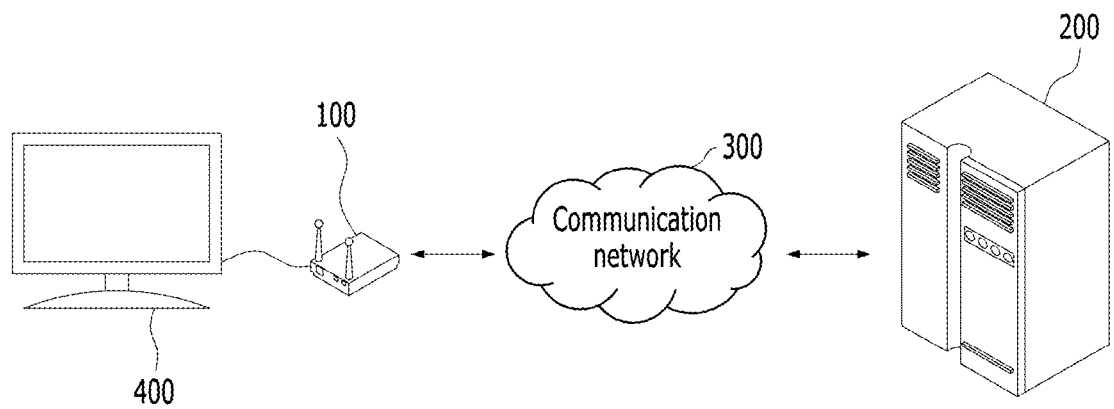
FIG. 1 illustrates a digital video broadcasting system for providing a real-time customized promotion channel in accordance with at least one embodiment.

FIG. 1 illustrates a digital video broadcasting system for providing a real-time customized promotion channel in accordance with at least one embodiment.

Referring to FIG. 1, a digital video broadcasting system may include user device 100 and service server 200. In particular, user device 100 and service server 200 may be coupled through communication network 300. User device 100 may be coupled to display 400.

Service server 200 may be a computer system or a group of computers, managed by a digital contents service provider for providing promotion channels as well as digital contents service, such as a VOD service through a typical broadcasting system. For convenience and ease of understanding, a computing system of the digital contents service provider is illustrated as one single service server 200. However, the embodiments are not limited thereto. In another embodiment, service server 200 may be a dedicated server for providing one promotion channels, and the digital video broadcasting system may further include more servers each dedicated for providing it's own function, such as providing digital contents (e.g., movies and songs), converting typical analog broadcasting TV channels to digital streaming channels, and so forth.

In accordance with at least one embodiment, service server 200 may i) transmit (e.g., broadcast) a default promotion channel containing default promotion information and a plurality of hidden promotion channels each containing promotion information customized to a corresponding attribute of digital contents consumed by a viewer and ii) transmit channel information to a user device. Furthermore, the service server may include information on a channel locator of a related hidden promotion channel in digital contents.

For example, service server 200 may transmit a digital contents service channel to user device 200. The digital contents service channel may transmit digital contents selected by a viewer when the viewer selected the digital contents for watching or transmit promotion information for introducing digital contents available to viewers while not transmitting digital contents. Such a digital-contents service channel may be referred to as a VOD service channel or a promotion channel. That is, through such a digital contents service channel or promotion channel, service server 200 may enable a viewer to be informed about available digital contents, such as movies and music. Furthermore, the promotion channel may include information on a user interface for enabling a viewer to select one of digital contents, purchase the selected digital contents, and watch the selected digital contents.

In order to dynamically provide various customized promotion channels in accordance with at least one embodiment, service server 200 may configure a default promotion channel and a plurality of hidden promotion channels and transmit the default promotion channel and the plurality of hidden promotion channels to user device 100 using one of a unicast transmission scheme and a multicast transmission scheme. That is, service server 200 may transmit at least one of the default promotion channel and the hidden promotion channels upon a request of a viewer (e.g., user device 100) in a unicast transmission scheme. Or, service server 200 may broadcast (e.g., transmit) all of the default promotion channel and the hidden promotion channels to user device 100. User device 100 may receive the default promotion channel and the hidden promotion channels from service server 200 and tune one of the promotion channels at a default service channel number in accordance with at least one embodiment.

In accordance with at least one embodiment, service server 200 may transmit, as the promotion channel or the digital contents service channel, a default promotion channel and a plurality of hidden promotion channels to user device 100. The promotion channel may include a default promotion channel and a plurality of hidden promotion channels. The default promotion channel may be a channel containing default promotion information which is not customized according to attributes of digital contents. Each of the hidden promotion channels may be a customized channel containing customized promotion information according to attributes of digital contents.

In accordance with at least one embodiment, service server 200 may generate channel service information based on the default promotion channel and the plurality of hidden promotion channels and transmit channel service information to user device 100. The channel service information may include information on a channel number, a channel locator, a promotion type, and likes.

Service server 200 may provide a plurality of digital contents according to a viewer's request. In particular, service server 200 may provide a server for providing a VOD service. In accordance with at least one embodiment, service server 200 may include promotion type information (e.g., a channel locator) into each digital-content and provide the digital content upon the request of a viewer.

Service server 200 may allocate one channel number for the promotion channel (e.g., the digital contents service channel) including the default promotion channel and the plurality of hidden promotion channels in accordance with at least one embodiment. For example, service server 200 may allocate a same channel number to the default promotion channel and the plurality of hidden promotion channels in order to transmit not only the default promotion channel but also the plurality of hidden promotion channels through the same channel number in accordance with at least one embodiment.

As illustrated in FIG. 1, user device 100 may be connected to service server 200 through communication network 300 and coupled to display 400. Such user device 100 may be an electronic device capable of receiving signals (e.g., broadcasting signals, digital signal, digital contents and supplementary information thereof) from service server 200, reproducing digital contents, and displaying the reproduced digital contents through display 400. For example, user device 100 may be a set-top box for a digital content service (e.g., VOD service) and TV system, but the present disclosure is not limited thereto.

In accordance with at least one embodiment, user device 100 may receive a default promotion channel and a plurality of hidden promotion channels, detect an ending of digital contents being reproduced and displayed on a display, select one of on the default promotion channel and hidden promotion channels based on at least one attribute of the digital contents, and tune the selected promotion channel on the digital-contents service channel after displaying the digital contents. That is, a real-time customized promotion channel may be provided to a viewer according to at least one attribute of displayed digital contents. Furthermore, the user device may detect information on a channel locator of a related hidden promotion channel in digital contents current being reproduced and displayed, select a hidden promotion channel having the detected channel locator, and tune a digital contents service channel with the selected hidden promotion channel after the displayed digital contents end.

Figure 3:
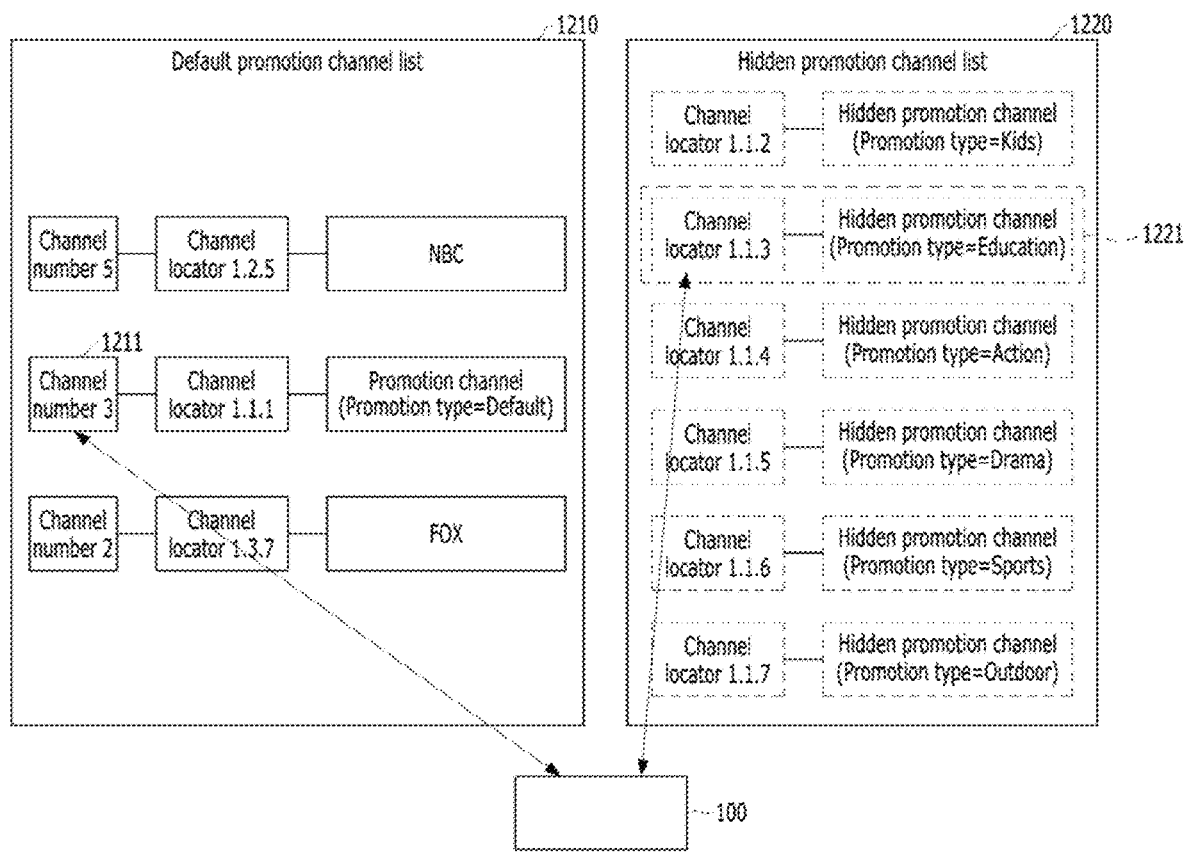
FIG. 3 illustrates channel list information generated by a user device based on channel service information from a server in accordance with at least one embodiment.

In accordance with at least one embodiment, user device 100 may receive the channel service information from server 200, identify a default promotion channel and a plurality of hidden promotion channels based on the received the channel service information, and generates channel list information, as shown in FIG. 3, based on the identified default promotion channel and hidden promotion channels. The channel list information may include information on channel numbers of the default promotion channel, the plurality of hidden promotion channel, and a channel locator.

User device 100 may process the received digital contents and display the processed digital contents through the digital contents service channel (e.g., promotion channel) on display 400 (e.g., monitor, TV or computer, or mobile device so forth) according to a request of a viewer. User device 100 may receive, based on the channel list information, a promotion channel related to the displayed digital contents from server 200. Herein, the related promotion channel may be a promotion channel containing promotion information customized according to at least one attribute of the display digital contents.

For example, when the displayed digital contents includes information on a channel locator of a particular hidden promotion channel, user device 100 may tune the particular hidden promotion channel at the default channel number of the digital contents service channel and reproduce the customized promotion information received through the particular hidden promotion channel and output the reproduced and customized promotion information on display 400. When the digital contents exclude information on a channel locator of a particular hidden promotion channel, user device 100 may tune a default promotion channel at the default channel number of the digital contents service channel, reproduce the default promotion information included in the default promotion channels, and output the reproduced default promotion information on display 400 after the displayed digital contents end.

As described, in accordance with at least one embodiment, user device 100 may receive a default promotion channel and a plurality of hidden promotion channels, detect an ending of digital contents being reproduced and displayed on a display, select one of on the default promotion channel and hidden promotion channels based on at least one attribute of the digital contents, and tune the selected promotion channel on the digital-contents service channel after displaying the digital contents. That is, a real-time customized promotion channel may be provided to a viewer according to at least one attribute of displayed digital contents. Furthermore, the user device may detect information on a channel locator of a related hidden promotion channel in digital contents current being reproduced and displayed, select a hidden promotion channel having the detected channel locator, and tune a digital contents service channel with the selected hidden promotion channel after the displayed digital contents end.

Figure 2:
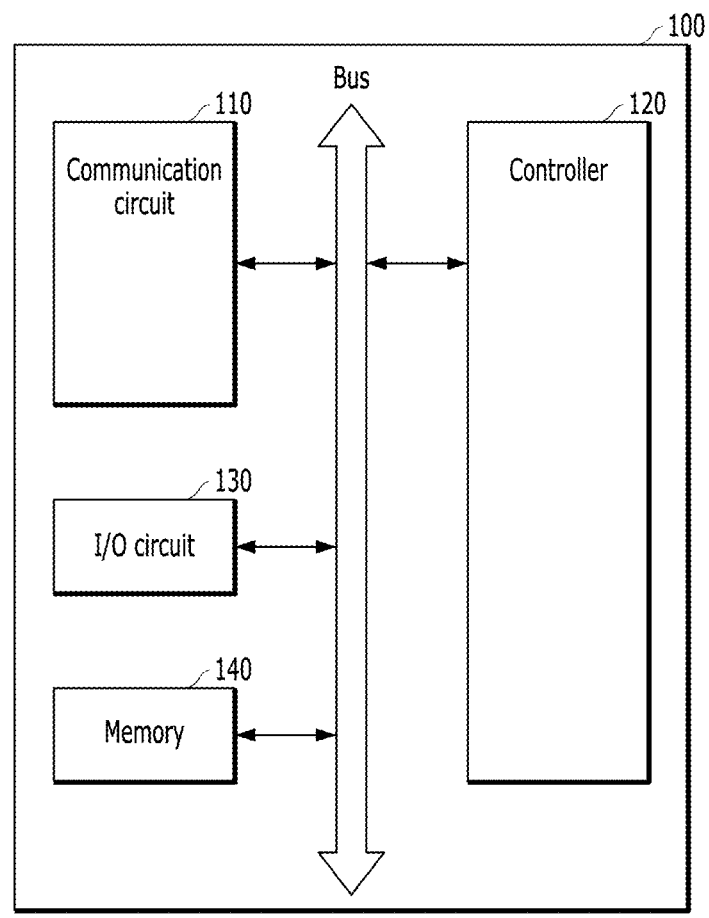
FIG. 2 illustrates a user device in accordance with at least one embodiment.
Figure 4:
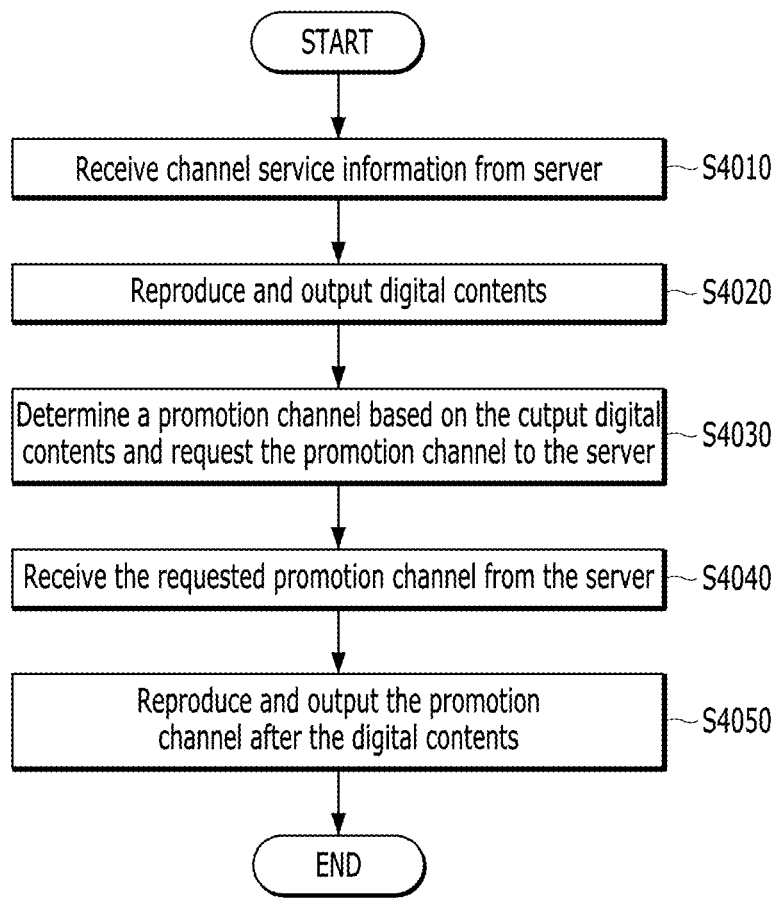
FIG. 4 is a flowchart illustrating a method of a user device for providing a customized promotion channel in accordance with at least one embodiment.

Hereinafter, such user device 200 and operations thereof in accordance with at least one embodiment will be described in detail with reference of FIG. 2 to FIG. 4. FIG. 2 illustrates a user device in accordance with at least one embodiment. FIG. 3 illustrates channel list information generated by a user device based on channel service information from a server in accordance with at least one embodiment. FIG. 4 is a flowchart illustrating a method of a user device for providing a customized promotion channel in accordance with at least one embodiment.

Referring to FIG. 2, user device 100 may be a personal computing device capable of receiving digital data from other entities through a predetermined communication network, transmitting digital data to other entities through a predetermined communication network, processing the digital data to perform operations for reproducing digital contents including supplementary digital information and displaying the reproduced digital contents on a display, as a digital contents service or a VOD service. As described, user device 100 may be a set-top box for receiving TV broadcasting signals and digital contents from broadcasting stations, but not limited thereto. User device 100 may be a portable electronic device capable of communication and performing operations for receiving, reproducing, and displaying digital contents, such as a smart phone, a tablet, and a laptop computer.

User device 100 may include communication circuit 110, controller 120, Input/output circuit 130, and memory 140. That is, user device 100 may include a memory, a memory controller, at least one processor (e.g., central processing unit: CPU), peripheral interfaces, input/output (I/O) subsystems, display device, an input device, and a communication circuit.

Communication circuit 110 may communicate with other entities including service server 200 through communication network 300. Communication circuit 110 may include at least one module (or at least one circuit) for communicating with other entities through a communication network. Herein, the communication network may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TIS-PAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 1300 may include at least one of a wireless communication circuit and a wired communication circuit. Herein, the wireless communication circuit and wired communication may be separately or integrally configured.

In particular, communication circuit 110 may perform communication through a RF signal. Communication circuit 110 may convert a RF signal to a digital signal (e.g., electric signal) or a digital signal to a RF signal and transmit the converted signal through a communication network. Communication circuit 110 may include an antenna system, a RF transceiver, at least one of amplifiers, a tuner, at least one of oscillators, a digital signal processor, a CODEC chipset, a subscriber identity module (SIM) card, and a dedicated memory.

Controller 120 may perform or control overall operation of user device 100. For example, controller 120 may be a central processing circuitry that controls constituent elements (e.g., memory, communication circuit, etc.) of user device 100 and/or performs a variety of operations (or functions) of user device 100. Controller 120 may be at least one of processors. Controller 120 may perform operations for receiving a default promotion channel and a plurality of hidden promotion channels, detecting an ending of digital contents being reproduced and displayed on a display, selecting one of on the default promotion channel and hidden promotion channels based on at least one attribute of the digital contents, and tuning the selected promotion channel on the digital-contents service channel after displaying the digital contents. Furthermore, controller 120 may perform operations for detecting information on a channel locator of a related hidden promotion channel in digital contents current being reproduced and displayed, selecting a hidden promotion channel having the detected channel locator, and tuning a digital contents service channel with the selected hidden promotion channel after the displayed digital contents end.

Memory 140 may store a variety of information, such as software programs for operation, data received from other entities, and data generated as result of operations. That is, memory 140 may store an operation system data, applications, and related data, received from other entities through a variety of communication media (e.g., communication networks). Memory 140 may include at least one of an internal memory and an external memory according to embodiments. For example, memory 140 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Communication circuit 120 may receive channel service information from service server 200. The channel service information may include information (e.g., channel information including a channel number and a channel locator of each promotion channel and typical channel) on a default promotion channel, a plurality of hidden promotion channels, and channel's program schedules. The channel numbers of the hidden promotion channels are set to identical to the channel number of the default promotion channel. Here, the default promotion channel is a digital contents service channel (e.g., VOD service channel) for providing default promotion information for informing a viewer of available digital contents without customized to a particular viewer and a user interface for enabling a viewer to select, purchase, and watch one of the digital contents. The hidden promotion channels are a virtual channel not included in the channel schedule. Each of the hidden promotion channels may include promotion information customized to a particular group of viewers, such as Kids, or a particular genre, such as a drama, action, and likes.

Channel service information may include promotion channel type information for identifying or indicating the default promotion channel and the plurality of hidden promotion channels or for indicating whether it is a default promotion channel or a hidden promotion channel. That is, the promotion channel type information may be information on a promotion channel or promotion information corresponding to a promotion type. The promotion channel type information may correspond to a promotion attribute value. The promotion attribute value may include at least one of a digital-contents genre (e.g., drama, action, and horror), a viewer restriction or an age restriction (e.g., PG-13, R,), a viewer gender (e.g., male, female), and so forth. For example, in case of the default promotion channel, the promotion attribute value thereof is set as a default value, and a digital-contents genre may be set as all genres. In case of a hidden promotion channel, an attribute value thereof may be set according to genres, such as kids. In this case, a promotion contents genre of the hidden promotion channel may be set as the corresponding genre 'Kid.' As shown in FIG. 3, each hidden promotion channel has a unique promotion type, such as Kids, Education, Action, Drama, Sports, and Outdoor. For example, hidden promotion channel 2221 has a promotion type of "Education" and includes promotion information related to Education.

Controller 120 may identify the predetermined default promotion channel and the plurality of hidden promotion channels based on the received channel service information. For example, controller 120 may determine whether the channel service information includes a promotion channel having a default promotion type and identify the determined channel as the default promotion channel when the channel service information includes the channel having the default promotion type. Furthermore, controller 120 may determine whether the channel service information includes a promotion channel having a second promotion type. When the channel service information includes a promotion channel having a second promotion type, controller 120 may identify the determined channel as hidden promotion channels.

In accordance with at least one embodiment, controller 120 may identify channels based on a promotion type of each channel and generate channel list information, as shown in FIG. 3. For example, controller 120 may generate channel list information 1210, 12220 based on information of the identified channels, such as the default promotion channel, the hidden promotion channels, and typical broadcasting channels. The channel list information may include a channel number, a channel locator, and a promotion type of channel.

As described, FIG. 3 shows channel list information in accordance with at least one embodiment. As shown in FIG. 3, the channel list information may include a typical channel list 1210 and hidden promotion channel list 1220. That is, as shown in FIG. 3, controller 120 may generate i) typical channel list 1210 including information on a typical broadcasting channels and a default promotion channel having a first promotion type (e.g., default) and ii) hidden promotion channel list 1220 including information on hidden promotion channels each having a corresponding promotion type, such as Kids, Education, Action, Drama, Sports, and Outdoor.

Input and Output (I/O) circuit 130 may be interconnected to at least one of communication circuit 110, controller 120, and memory 140, receive at least one signal processed, stored, or received through at least one of communication circuit 110, controller 120, and memory 140, and output the processed signals to a designated device (e.g., display 400) in response to the control of controller 120 in accordance with at least one embodiment. For example, I/O circuit 130 may receive reproduced digital contents from controller 120 and output the reproduced digital contents to display 400 according to a control of controller 120.

Controller 120 may determine a promotion type related to the displayed digital-contents based on attributes of the digital contents. For example, the digital contents may include supplementary information indicating a related promotion type. Service server 200 or a related server may include such supplementary information into the each digital contents serviced to viewers. In accordance with at least one embodiment, service server 200 may include a promotion type into each digital content. Accordingly, controller 120 of user device 100 may determine a promotion type of the displayed digital contents based on the supplementary information included in the digital contents.

Controller 120 may select at least one of channel locators of the default promotion channel and hidden promotion channels based on the channel list information and the promotion type information of the displayed digital contents.

Controller 120 may select one that matches with the promotion type of the displayed digital contents among the default promotion channel and hidden promotion channels. For example, when one of channel locators of hidden promotion channels matches with the promotion type information of the outputting contents, controller 120 selects the matched channel locator. When none of channel locators of hidden promotion channels matches with the promotion type information of the outputting contents, controller 120 selects a channel locator of the default promotion channel.

As another example, When none of channel locators of hidden promotion channels matches with the attribute value of the outputting contents, controller 120 may extract a channel number and a channel locator of a default promotion channel 1211 from default promotion channel list 1210. Then, controller 120 may request a corresponding default promotion channel of the extracted channel locator of the default promotion channel to server 200. As still another example, when contents attribute value indicates that the genre of the contents is Kid, controller 120 may extract a channel locator of a hidden promotion channel 810 corresponding to the genre Kid from hidden promotion channel list 800. Then, controller 120 may request a corresponding hidden promotion channel of the channel locator of the extracted hidden promotion channel.

I/O circuit 130 may tune a selected promotion channel at a customized promotion channel after the digital-contents end in accordance with at least one embodiment. For example, when controller 120 selects hidden promotion channel 1221 because the displayed digital-contents includes information on a channel locator 1.1.3, I/O circuit 130 may tune hidden promotion channel 1221 at channel number 3 as the customized promotion channel and display promotion information related to Education. Hereinafter, operations of user device 200 will be described in detail with reference to FIG. 4.

FIG. 4 is a flowchart for describing a method of a user device for providing a real-time customized promotion channel in accordance with at least one embodiment. Referring to FIG. 4, user device 100 may receive channel service information from server 200 at step S4010. For example, when user device 100 is initially powered on, user device 100 receives the channel service information from service server 100, but not limited thereto. After initially powered on, user device 100 may continuously receive the channel service information and continuously update the channel service information. As described, channel service information may include information on typical channels, a customized promotion channel including a default promotion channel, a promotion type of each channel, a channel locator of each channel, a channel number of each channel, as shown in FIG. 3. Furthermore, user device 100 may generate channel list information based on the received channel service information. In particular, user device 100 may obtain promotion channels having a Promo channel descriptor in the channel service information and store the obtained promotion channels in the channel list information.

At step S4020, user device 100 may receive digital contents according to a viewer's selection. For example, after initially powered on or no digital contents selected, user device 100 may tune a default promotion channel at the digital contents service channel, reproduce the default promotion information and user interface information, and output the default promotion information and the user interface information through the digital contents service channel. In accordance with at least one embodiment, user device 100 may obtain a promotion channel having a promo_type set a "Default" from the channel list information and tune the digital contents service channel with a channel locator of the obtained promotion channel which has the promo_type set as "Default."

When a viewer selects a movie based on the default promotion information and the user interface information, user device 100 may request the selected movie to service server 200, may receive digital contents of the selected movie from service server 200, reproduce and output the received digital contents through the digital contents service channel.

At step S4030, user device 100 may determine a promotion channel related to the displayed digital contents based on the supplementary information of the digital contents and the channel service information. For example, user device 100 may determine whether the displayed digital contents include a channel locator of a particular promotion channel or a promo_type parameter.

At step S4040, user device 100 may tune the digital contents service channel (e.g., promotion channel or VOD service channel) with the selected promotion channel. For example, when the displayed digital contents include the channel locator of the particular promotion channel, user device 100 may tune the digital contents service channel with the channel locator included in the displayed digital contents. When the displayed digital contents include the promo_type parameter, user device 100 may select a channel locator having the same promo_type in the channel list information and tune the digital contents service channel with the selected channel locator.

At step S4050, user device 100 may reproduce the selected promotion channel and display the related promotion information on display 400 after the reproducing of the digital contents ends.

As described, service server 200 may configure a plurality of hidden promotion channels each containing promotion information customized according to a predetermined attribute of related digital contents, transmit service channel information including the configured promotion channels to a user device, and transmit the configured promotion channels using one of a unicast transmission scheme or a multicast transmission scheme to the user device. Furthermore, service server 200 may include information on a channel locator of a related hidden promotion channel in digital contents.

Figure 5:
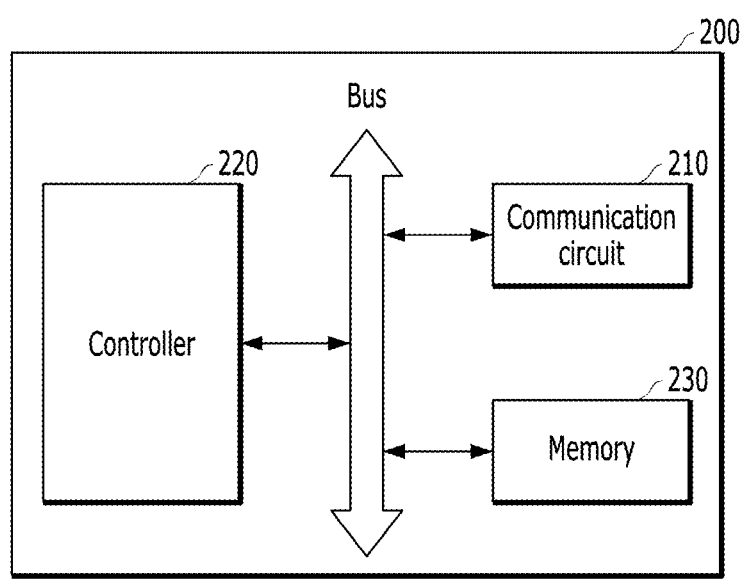
FIG. 5 is a diagram illustrating a server for providing a promotion channel in accordance with at least one embodiment.

Hereinafter, service server 200 and operations thereof will be described with reference to FIG. 5, FIG. 6, FIG. 9, and FIG. 10. FIG. 5 is a diagram illustrating a service server in accordance with at least one embodiment. Service server 200 may include communication circuit 210, controller 220, and memory 230.

Service server 200 may include a memory, a memory controller, at least one processor (e.g., central processing unit: CPU), peripheral interfaces, input/output (I/O) subsystems, display device, an input device, and a communication circuit. The communication circuit may communicate with other entities including user devices through a mobile communication network. The communication circuit may include at least one module (or at least one circuit) for communicating with other entities through a communication network. Herein, the communication network may include a variety of communication networks such as a wireless communication network and a wired communication network. For example, the communication network may include a wideband code division multiple access (WCDMA) network, a microwave access (WiMAX) network, a wireless fidelity (Wi-Fi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiment, communication circuit 1300 may include at least one of a wireless communication circuit and a wired communication circuit. Herein, the wireless communication circuit and wired communication may be separately or integrally configured. The at least one processor including a controller may perform or control overall operation of server 200.

For example, memory 230 may store a variety of information, such as software programs for operation, data received from other entities, and data generated as result of operations. That is, memory 230 may store an operation system data, applications, and related data, received from other entities through a variety of communication media (e.g., communication networks). Memory 230 may include at least one of an internal memory and an external memory according to embodiments. For example, memory 230 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

For example, controller 210 may configure a default promotion channel and a plurality of hidden promotion channels. For example, controller 210 may configure a default promotion channel to provide general promotion information which is not customized to a particular attribute of digital contents (e.g., movies, Television shows, songs, likes). That is, the default promotion channel may contain default promotion information transmitted through a typical service channel (e.g., digital contents service channel or VOD service channel) which is scheduled to be broadcasted according to a channel schedule of a corresponding digital video broadcasting service provider. Furthermore, controller 210 may configure a plurality of hidden promotion channels each providing promotion information customized according to at least one attribute of digital contents. The plurality of hidden promotion channels may be virtual channels which are not scheduled to be transmitted according to the channel schedule of the broadcasting service provider.

Controller 210 may assign a promotion type to each promotion channel including the default promotion channel and the hidden promotion channels in accordance with at least one embodiment. Such a promotion type may denote a type of promotion information transmitted through a corresponding promotion channel. Furthermore, such a promotion type also denotes attribute of digital contents. For example, when a promotion type is Kids, a corresponding promotion channel transmits promotion information related to Kids movies or animations.

Controller 210 may assign a channel locator to each of a plurality of hidden promotion channels. For example, controller 210 may map promotion type information (e.g., viewer restriction, viewer gender, genre) of each of the plurality of hidden promotion channels to the assigned channel locator of each hidden promotion channel and store the mapping information as channel service information.

Controller 210 may set a channel number of a default promotion channel and channel numbers of hidden promotion channels with the same value in order to output the default promotion channel and the hidden promotion channels at the same channel number.

Controller 210 may generate channel service information based on the set default promotion channel and hidden promotion channels. The channel service information may include channel schedule information (e.g., channel number) and channel address of the default promotion channel and hidden promotion channels. The channel service information may include promotion channel type information (e.g., genre, viewer restriction, and viewer gender) for classifying the default promotion channel and hidden promotion channels.

In accordance with at least one embodiment, the promotion channel information may be defined to denote a promotion type of each promotion channel and transmitted to user device 100. In particular, FIG. 9 illustrates the promotion channel defined as a promo channel descriptor in DVB and ATSC digital broadcasting. As shown in FIG. 9, the promotion channel information may be defined as a promo channel descriptor having a parameter of promo_type. Such promo_type has a 8-bit field specifying the type of contents in the promo channel. As shown in FIG. 9, a value of promo_type denotes a type of contents in the promotion channel, such as a default, a general, a TV, a Movie, a Kids, and likes.

In accordance with another embodiment, the promotion channel information may be defined using a parameter Extendeditem element in the IPTV standard. In particular, FIG. 10 illustrates promotion channel information defined as Extendeditem element in internet protocol television (IPTV) standard in accordance with at least one embodiment. As shown in FIG. 10, a name of Extendeditem is defined as "Promo channel," and a hexa value of the promotion type is assigned to the Extendeditem.

Communication circuit 210 may transmit the generated channel service information to user device 100. User device 100 may identify the default promotion channel and the hidden promotion channels based on the channel service information and generate a channel list information based on the identified channels. The channel list information may include a channel number of a channel locator of the default promotion channel and the hidden promotion channels.

Communication circuit 210 may transmit a promotion channel related to attribute value of the contents based on the channel service information when the digital contents outputting and displayed on user device 100 ends. The related promotion channel may correspond to a promotion channel included in the channel list information.

In particular, communication circuit 210 may transmit a hidden promotion channel to user device 100 when the hidden promotion channel matches with the attribute value of the contents producing in user device 100.

Communication circuit 210 may transmit a default promotion channel to user device 100 when none of the hidden promotion channels matches with the attribute value of the digital contents reproduced in user device 100.

Figure 6:
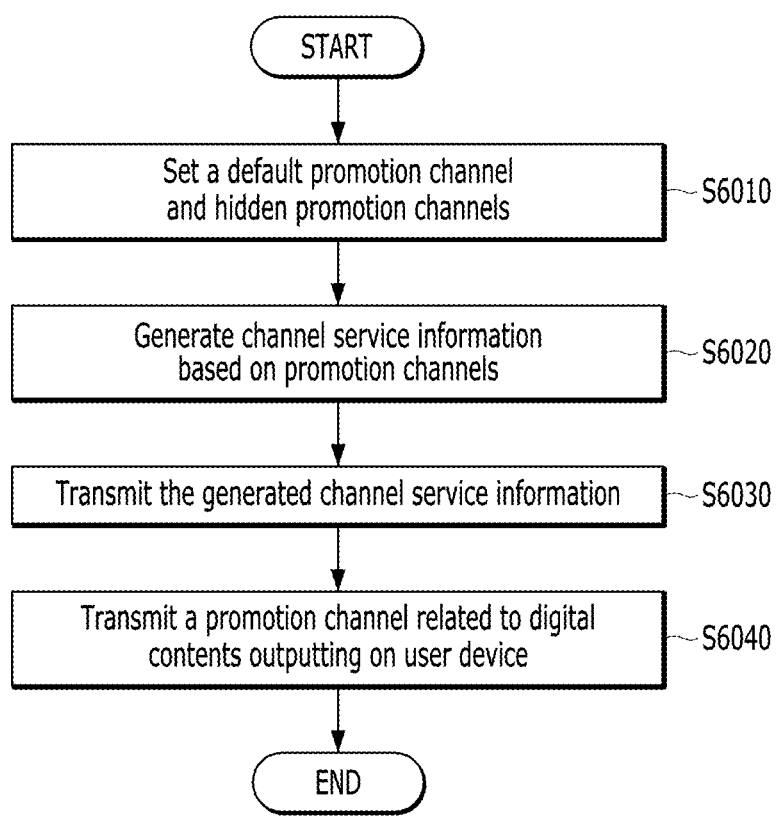
FIG. 6 is a flowchart illustrating a method of a server for providing a promotion channel in accordance with at least one embodiment.

FIG. 6 is a flowchart illustrating a method of a server for providing a real-time customized promotion channel in accordance with at least one embodiment. Referring to FIG. 6, service server 200 may configure a default promotion channel and a plurality of hidden promotion channel at step S6010. As described above, the default promotion channel is configured to transmit default promotion information, and the plurality of hidden promotion channels are configured to transmit customized promotion information according to a viewer' preference or at least one attribute of digital contents.

At step S6020, service server 200 may generate channel service information based on the default promotion channel and the plurality of hidden promotion channels. At step S6030, server 200 may transmit the channel service information to user device 100.

At step S6040, server 200 may transmit a promotion channel related to attribute value (e.g., promotion type, channel locator) of digital contents reproducing in user device 100 and displayed on display 400 when user device 100 ends reproducing the contents. As described, service server 200 may use two transmission schemes for transmitting the promotion channels, such as a unicast transmission mode and a multicast transmission mode according to a digital video broadcasting technology. For example, service server 200 may transmit a selected promotion channel to user device 100 in response a request from user device 100. As another example, service server 200 may broadcast (continuously transmit) the default promotion channel and the plurality of hidden promotion channels to user device 100. In this case, user device 100 may select the selected one among the broadcasted default promotion channel and hidden promotion channels without requesting service server 200 to transmit the selected promotion channel.

Figure 7:
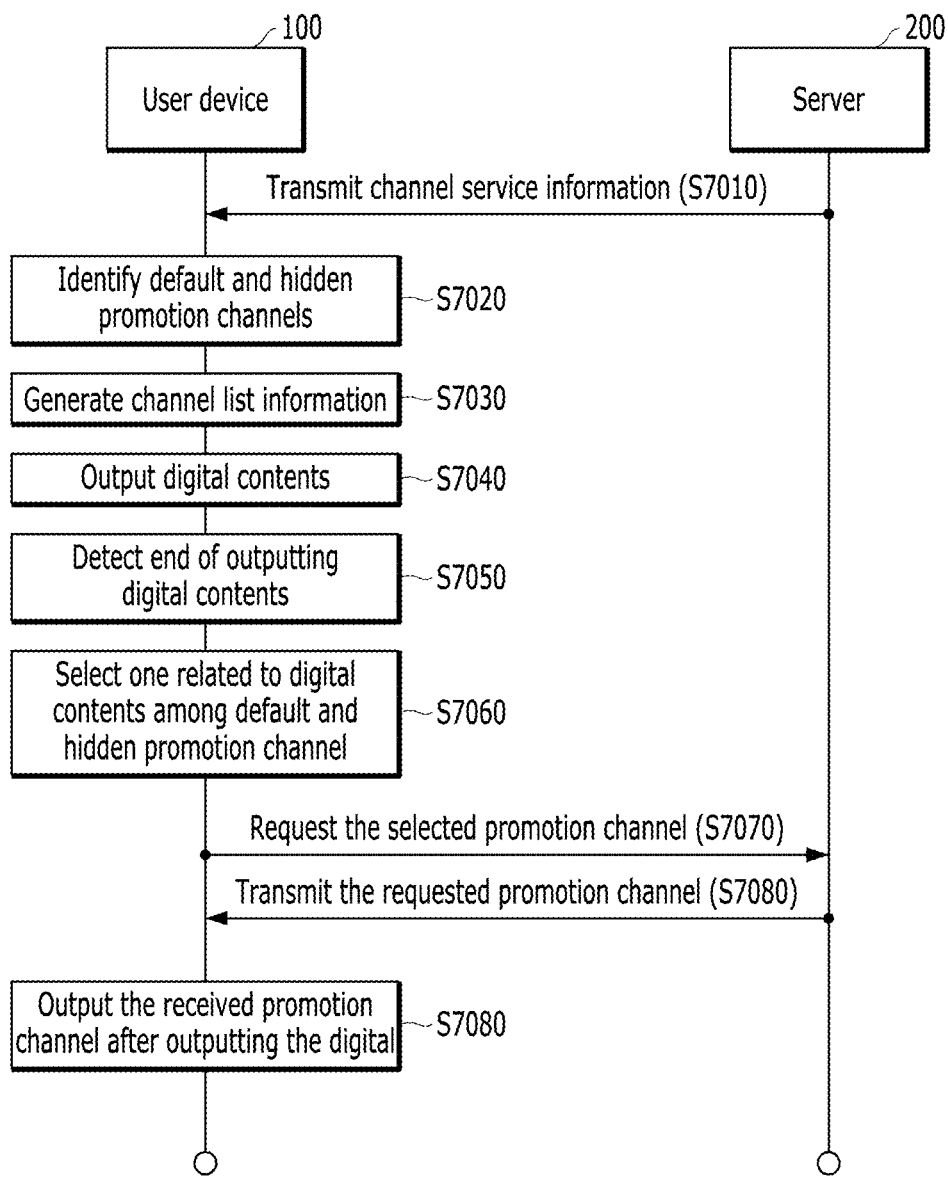
FIG. 7 is a flowchart illustrating a method for providing a promotion channel in accordance with at least one embodiment.

Hereinafter, more embodiments of the present disclosure will be described with reference to FIG. 7 and FIG. 8. FIG. 7 illustrates a method for providing a promotion channel in accordance with one embodiment of the present disclosure. Referring to FIG. 7, at step S7010, server 200 may generate channel service information based on a default promotion channel and a plurality of hidden promotion channels and transmit the generated channel service information to user device 100. At step 7020, user device 100 may identify the default promotion channel and the plurality of hidden promotion channels based on the channel service information. At step S7030, user device 100 may generate channel list information based on the identified default promotion channel and hidden promotion channels. At step S7040, user device 100 may receive digital contents from service server 2100 according to a request of a user, reproduce the received digital contents, and output the digital contents through the digital contents service channel (e.g., promotion channel). At step S7050, user device 100 may detect the ending of the displayed digital contents. At step S7060, user device 100 may select one of channel locators of the default promotion channel and hidden promotion channels based on attributes of the reproducing digital contents and the channel list information. For example, the digital contents may include supplementary information having a channel locator of related promotion channel in accordance with at least one embodiment. User device 100 may detect the channel locator included in the supplementary information of the displayed digital contents and select a promotion channel having the detected channel locator based on the channel list information.

At step S7070, user device 100 may request the selected promotion channel to server 200. At step S7080, user device 100 may receive the requested promotion channel from server 200. In accordance with another embodiment, service server 200 may broadcast the selected promotion channel with the other promotion channels, and user device 100 may tune the digital contents service channel (e.g., promotion channel) with the selected promotion channel using the selected channel locator and receive the related promotion information through the selected promotion channel which is related to the displayed digital contents.

At step S7090, user device 100 may reproduce the received promotion information transmitted through the selected promotion channel when the displayed digital contents end.

Figure 8:
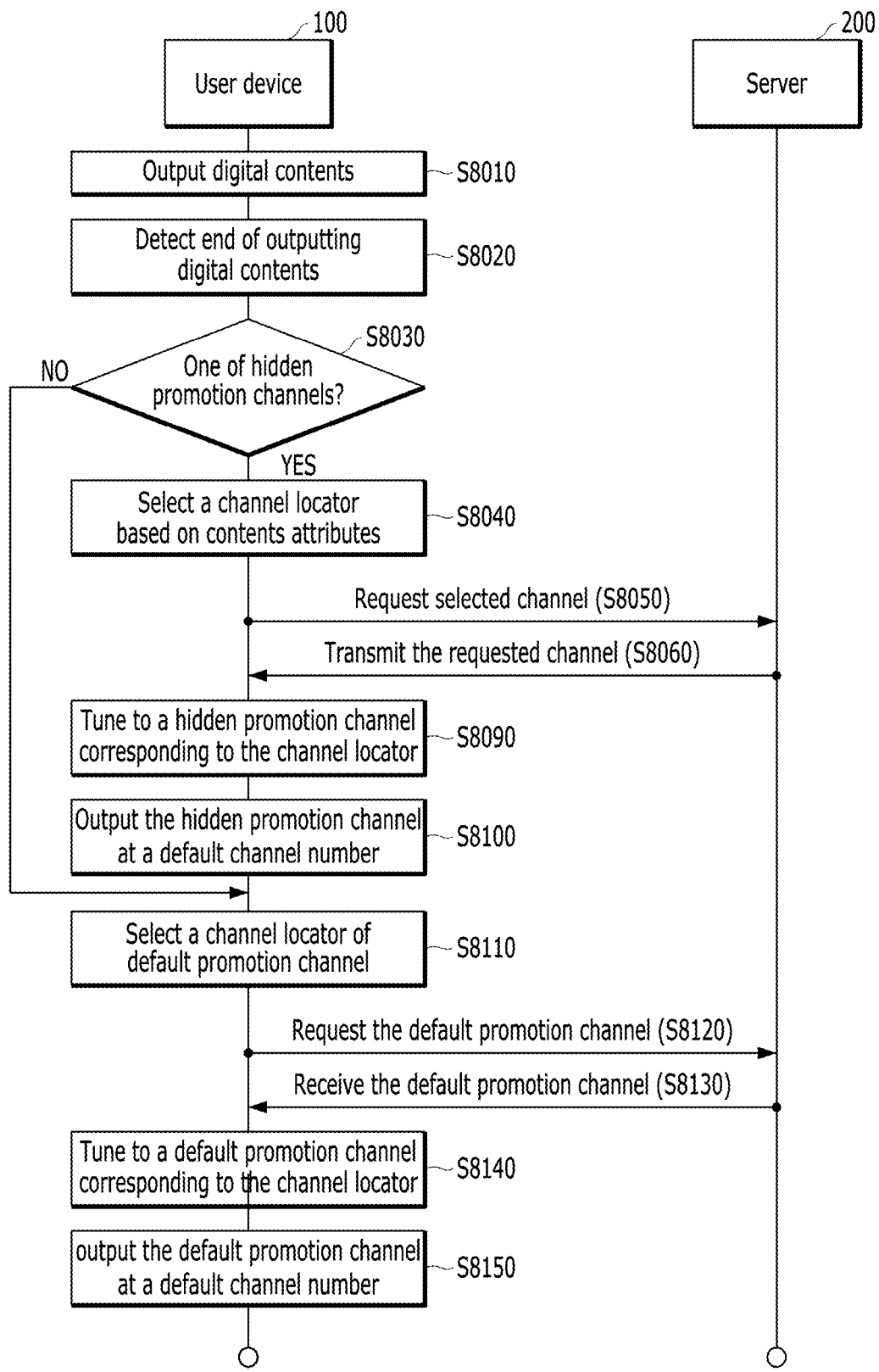
FIG. 8 is a flowchart illustrating a method for providing a promotion channel in accordance with another embodiment

FIG. 8 illustrates a method for providing promotion channel in accordance with another embodiment of the present disclosure. Referring to FIG. 8, user device 100 may reproduce digital contents according to user's request at step S8010. At step S8020, user device 100 may detect ending of the displayed digital contents. At step S8030, user device 100 may determine whether at least one of channel locators of hidden promotion channels corresponds to attributes of the displayed digital contents.

In case of Yes-S8030, user device 100 may select a channel locator corresponding to the attribute value of the contents at step S8040. At step S8050, user device 100 may request a hidden promotion channel of the selected channel locator to server 200. In accordance with another embodiment, user device 100 may determine the hidden promotion channel of the selected channel locator based on the channel list information.

At step S8060, user device 100 may receive the hidden promotion channel from server 200. At step S8070, user device 100 may tune the received hidden promotion channel at the channel locator after user device 100 ends reproducing the contents. At step S8080, user device 100 may reproduce the hidden promotion channel at the channel number of the default promotion channel.

In case of No-S8030, user device 100 may select a channel locator of a default promotion channel at step S8080. At step S8090, user device 100 may request a default promotion channel of the selected channel locator to server 200. At step S8100, user device 100 may receive the default promotion channel from server 200. At step S8110, user device 100 may tune the received default promotion channel at the channel locator after user device 100 ends reproducing the contents. At step S8120, user device 100 may reproduce the default promotion channel at the channel number of the default promotion channel.

In the embodiment illustrated in FIG. 8, user device 100 is described as requesting a selected promotion channel to service server 200, but embodiments of the present disclosure are not limited thereto. As another embodiment, service server 200 may broadcast the selected promotion channel with the other promotion channels, and user device 100 may tune the digital contents service channel (e.g., promotion channel) with the selected promotion channel using the selected channel locator and receive the related promotion information through the selected promotion channel which is related to the displayed digital contents.

As described, in accordance with at least one embodiment, a service server may i) transmit (e.g., broadcast) a default promotion channel containing default promotion information and a plurality of hidden promotion channels each containing promotion information customized to a corresponding attribute of digital contents consumed by a viewer and ii) transmit channel information to a user device. The user device may detect an ending of digital contents being reproduced and displayed on a display, select one of on the default promotion channel and hidden promotion channels based on at least one attribute of the digital contents, and tune the selected promotion channel on a digital-contents service channel after displaying the digital contents. That is, a real-time customized promotion channel may be provided to a viewer according to at least one attribute of displayed digital contents. Furthermore, the service server may include information on a channel locator of a related hidden promotion channel in digital contents. The user device may detect information on a channel locator of a related hidden promotion channel in digital contents current being reproduced and displayed, select a hidden promotion channel having the detected channel locator, and tune a digital contents service channel with the selected hidden promotion channel after the displayed digital contents end.

In accordance with embodiments of the present disclosure, one of promotion channels may be dynamically selected in real-time according to at least one attribute of digital contents (e.g., movies or songs) that are currently reproduced by a user device and outputted through a coupled monitor. Furthermore, such a selected promotion channel may be obtained, reproduced, and displayed right after the displayed digital contents end. Accordingly, a viewer may be provided with promotion information customized with the viewer's preference. In addition, various promotion channels may be provided according to viewer's preferences through one dedicated channel in a digital broadcasting channel in accordance with at least one embodiment.

The above-described hardware structures and functions of the service server may improve functionalities of the service server (e.g., computing system) for providing better quality VOD services to viewers in accordance with at least one embodiment. Furthermore, the above-described hardware structures and functions of the user device may also improve the functionalities of the user device (e.g., set-top box) for providing better quality VOD services to views in accordance with at least one embodiment.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A user device for receiving in real-time, a customized promotion channel from a service server, the user device comprising:

communication circuit configured to receive channel service information from the service server in real-time, wherein the channel service information includes information on typical channels, a default promotion channel, and a plurality of non-scheduled virtual hidden promotion channels, and wherein the plurality of hidden promotion channels provides customized digital content and promotional information to a particular group of viewers or genre, and the default promotion channel provides non-customized digital content services;

Input/Output (I/O) circuit configured to reproduce digital contents and output the reproduced digital contents to a display based on a user's selection; and controller configured to generate channel list information based on the default promotion channel and the plurality of hidden promotion channels, wherein the channel list information includes channel numbers, channel locators of the default promotion channel and the plurality of hidden promotion channels, and a promotion type of each of the plurality of hidden promotion channels, and wherein the controller is further configured to select one of the default promotion channel and the plurality of hidden promotion channels based on at least one attribute of the digital contents, determine a promotion channel as the selected promotion channel, and request the selected promotion channel to the service server, wherein the attribute is one of genre, viewer restriction, age restriction, gender, and type of content.

2. The user device of claim 1, wherein the controller is configured to select one of the channel locators of the default promotion channel and the plurality of hidden promotion channels based on at least one attribute of the outputted digital contents and the channel list information.

3. The user device of claim 2, wherein when one of the channel locators of the plurality of hidden promotion channels is matched with at least one attribute of the outputted digital contents and the channel list information, the controller is configured to select the matched channel locator, and wherein the communication circuit is configured to receive a hidden promotion channel corresponding to the selected channel locator.

4. The user device of claim 3, wherein a channel number of the default promotion channel and channel numbers of the plurality of hidden promotion channels are set to a same number.

5. The user device of claim 4, wherein:
the I/O circuit is configured to tune the promotion channel with the hidden promotion channel of the selected channel locator; and
a channel number of the hidden promotion channel and a channel number of the default promotion channel are identical.

6. The user device of claim 2, wherein when a channel locator of the default promotion channel is matched with at least one attribute of the outputted digital contents and the channel list information, the controller is configured to select a channel locator of the default promotion channel, the communication circuit is configured to receive the default promotion channel, and the I/O circuit is configured to tune a promotion channel with the default promotion channel when the output digital contents end.

7. A service server for providing in real-time, a customized promotion channel, the service server comprising:

a controller configured to set a default promotion channel and a plurality of non-scheduled virtual hidden promotion channels, and generate channel service information based on the default promotion channel and the plurality of hidden promotion channels, and wherein the controller is further configured to generate channel list information based on the default promotion channel and the plurality of hidden promotion channels, wherein the channel list information includes channel numbers, channel locators of the default promotion channel and the plurality of hidden promotion channels, and a promotion type of each of the plurality of hidden promotion channels; and a communication circuit configured to transmit the generated channel service information to a user device and transmit at least one of the default promotion channel and the plurality of hidden promotion channels to the user device in real-time, and wherein the plurality of hidden promotion channels provides customized digital content and promotional information to a particular group of viewers or genre, and the default promotion channel provides non-customized digital content services.

8. The service server of claim 7, wherein:
the default promotion channel and the plurality of hidden promotion channels are identified based on the channel service information; and
the channel service information includes information on the default promotion channel and the plurality of hidden promotion channels.

9. The service server of claim 7, wherein when one of the channel locators of the hidden promotion channels is matched with at least one attribute of the outputted digital contents, the communication circuit is configured to transmit the matched hidden promotion channel to the user device.

10. The service server of claim 9, wherein the controller is configured to set a channel number of the default promotion channel and channel numbers of the plurality of hidden promotion channels with a same channel number.

11. The service server of claim 7, wherein when the channel locator of the default promotion channel is matched with at least one attribute of the outputted digital contents, the communication circuit is configured to transmit the matched default promotion channel to the user device.

12. The service server of claim 7, wherein the controller is configured to set the plurality of hidden promotion channels according to a genre of digital contents.

13. A method of providing in real-time, a customized promotion channel according to at least one attribute of displayed digital contents by a user device, the method comprising:

receiving channel service information from a service server in real-time, wherein the channel service information includes information on typical channels, a default promotion channel, and a plurality of non-scheduled virtual hidden promotion channels, and wherein the plurality of hidden promotion channels provides customized digital content and promotional information to a particular group of viewers or genre, and the default promotion channel provides non-customized digital content services;

receiving channel list information based on the default promotion channel and the plurality of hidden promotion channels, wherein the channel list information includes channel numbers, channel locators of the default promotion channel and the plurality of hidden promotion channels, and a promotion type of each of the plurality of hidden promotion channels reproducing and outputting digital contents based on a user's selection;

selecting one of the default promotion channel and the plurality of hidden promotion channels based on at least one attribute of the outputted digital contents based on the channel service information, determining a promotion channel as the selected promotion channel, and requesting the selected promotion channel to the server upon detection of end of outputted digital content, and wherein the attribute is one of genre, viewer restriction, age restriction, gender, and type of content;

receiving the requested promotion channel from the service server; and reproducing and outputting the received promotion channel after the outputted digital contents end.

14. The method of claim 13, selecting at least one of channel locators of the default promotion channel and the plurality of hidden promotion channels based on the channel service information and the at least one attribute of the outputted digital contents.

15. The service server of claim 9, wherein the controller assigns a promotion type to each of the promotion channels including the default promotion channel and the plurality of hidden promotion channels.

16. The service server of claim 9, wherein the controller assigns a channel locator to each of the plurality of hidden promotion channels.

17. The user device of claim 1, wherein:
the communication circuit configured to receive the requested promotion channel from the service server; and
the I/O circuit is configured to reproduce the requested promotion channel and output the reproduced promotion channel through the display after the outputted digital contents ends.

* * * * *